US010036805B2

(12) United States Patent
Lee et al.

(10) Patent No.: US 10,036,805 B2
(45) Date of Patent: Jul. 31, 2018

(54) METHOD AND APPARATUS FOR DETECTING SURROUNDING ENVIRONMENT BASED ON SENSING SIGNALS OF FREQUENCY-MODULATED CONTINUOUS WAVE RADAR AND CONTINUOUS WAVE RADAR

(71) Applicant: MANDO CORPORATION, Pyeongtaek-si, Gyeonggi-do (KR)

(72) Inventors: Jae Eun Lee, Seoul (KR); Hae Seung Lim, Yongin-si (KR); Seong Hee Jeong, Yongin-si (KR)

(73) Assignee: Mando Corportaion, Pyeongtaek-si, Gyeonggi-do (KR)

( * ) Notice: Subject to any disclaimer, the term of this patent is extended or adjusted under 35 U.S.C. 154(b) by 549 days.

(21) Appl. No.: 14/317,215

(22) Filed: Jun. 27, 2014

(65) Prior Publication Data

US 2015/0153447 A1    Jun. 4, 2015

(30) Foreign Application Priority Data

Dec. 2, 2013    (KR) .................. 10-2013-0148216

(51) Int. Cl.
*G01S 13/04*    (2006.01)
*G01S 13/32*    (2006.01)
(Continued)

(52) U.S. Cl.
CPC ............ *G01S 13/32* (2013.01); *G01S 13/343* (2013.01); *G01S 13/36* (2013.01); *G01S 13/536* (2013.01);
(Continued)

(58) Field of Classification Search
CPC ........ G01S 13/32; G01S 13/343; G01S 13/36; G01S 13/584; G01S 13/931;
(Continued)

(56) References Cited

U.S. PATENT DOCUMENTS 7,023,376 B1*    4/2006    Kuroda ................... G01S 7/352
                                                              342/195
2012/0112955 A1*    5/2012    Ando ...................... G01S 7/352
                                                              342/159
(Continued)

FOREIGN PATENT DOCUMENTS

EP            0932052 A2      7/1999
JP        1995-191133 A       7/1995
(Continued)

OTHER PUBLICATIONS

Chinese Office Action dated Aug. 1, 2016 in connection with the counterpart Chinese Patent Application No. 201410302417.3, citing the above reference(s).

(Continued)

*Primary Examiner* — Timothy A Brainard
(74) *Attorney, Agent, or Firm* — Hauptman Ham, LLP

(57) ABSTRACT

Disclosed herein are a method and apparatus for detecting a surrounding environment based on a Continuous Wave (CW) radar sensing signal and a Frequency-Modulated Continuous Wave (FMCW) radar sensing signal. A method of detecting a target based on a Frequency-Modulated Continuous Wave (FMCW) radar sensing signal and a Continuous Wave (CW) radar sensing signal may include sending, by a radar, the CW radar sensing signal for detecting the target and receiving a first response signal that is a response to the CW radar sensing signal; sending, by the radar, the FMCW radar sensing signal for detecting the target and receiving a second response signal that is a response to the FMCW radar sensing signal; generating, by the radar, the frequency spectrum of a beat signal by performing signal processing on the first response signal and the second response signal.

6 Claims, 8 Drawing Sheets

(51) Int. Cl.
*G01S 13/34* (2006.01)
*G01S 13/36* (2006.01)
*G01S 13/536* (2006.01)
*G01S 13/58* (2006.01)
*G01S 13/93* (2006.01)
*G01S 7/35* (2006.01)
*G01S 13/86* (2006.01)

(52) U.S. Cl.
CPC .......... *G01S 13/584* (2013.01); *G01S 13/931* (2013.01); *G01S 13/86* (2013.01); *G01S 2007/356* (2013.01); *G01S 2013/9353* (2013.01)

(58) Field of Classification Search
CPC ............. G01S 13/536; G01S 2007/356; G01S 2013/9353; G01S 13/86; G01S 13/345; G01S 2007/2927
USPC .......................................................... 342/27
See application file for complete search history.

(56) References Cited

U.S. PATENT DOCUMENTS

2012/0268313 A1* 10/2012 Shimizu .................. G01S 7/412
 342/107
2013/0342382 A1* 12/2013 Maeno .................. G01S 7/2927
 342/93

FOREIGN PATENT DOCUMENTS

| | | |
|---|---|---|
| JP | 2000147103 A | 5/2000 |
| JP | 2010112937 A | 5/2010 |
| JP | 2011128119 A | 6/2011 |
| KR | 101092567 B1 | 12/2011 |

OTHER PUBLICATIONS

Korean Office Action dated Jan. 2, 2018, in connection with the Korean Patent Application No. 1020130148216, citing the above reference(s).

* cited by examiner

METHOD AND APPARATUS FOR DETECTING SURROUNDING ENVIRONMENT BASED ON SENSING SIGNALS OF FREQUENCY-MODULATED CONTINUOUS WAVE RADAR AND CONTINUOUS WAVE RADAR

CROSS-REFERENCE TO RELATED APPLICATION(S)

This application claims priority to Korean Patent Application No(s). 10-2013-0148216, filed on Dec. 2, 2013, the disclosure(s) of which is (are) incorporated herein by reference in its (their) entirety.

BACKGROUND OF THE INVENTION

Field of the Invention

Exemplary embodiments of the present invention relate to a method of sensing a surrounding environment, and more particularly, to a method and apparatus for detecting a surrounding environment based on a Continuous Wave (CW) radar and a Frequency-Modulated Continuous Wave (FMCW) radar.

Description of the Related Art

ITU-R recommends various kinds of items related to Transport Information and Control Systems (TICS). The TICS is a system in which computer, communication, location information, and vehicle technologies are integrated in order to improve the safety and efficiency of a ground transport system and a method of managing the ground transport system.

Advanced Vehicle Control Systems (AVCS) that belong to the TICS and that are related to the direct driving of a vehicle includes some items required to prevent a collision. A radar for vehicles is one of techniques that may be applied for safe vehicle driving through the assistance of a driver.

In the early 1980s, a radar using a laser was first commercialized as the radar for vehicles in Japan. A method using millimeter waves is now widely used because the radar is too sensitive to various kinds of weather conditions. A radar for vehicles using millimeter waves is one of fields on which the most active research is now being carried out because it has a characteristic in that the radar has relatively small errors even in various kinds of weather conditions in terms of its characteristics. Research on such a method was started in the early 1970s, and various kinds of products are attached to vehicles and driven. Technologies using vehicle radars are called active cruise control, adaptive cruise control, or intelligent cruise control. Representative companies who apply such technologies to vehicles include Daimler-Benz, BMW, Jaguar, and Nissan. In particular, the fact that a vehicle is directly controlled past a simple warning level using a radar in the above application examples may be said to be a significant technological advance.

In relation to conventional intelligent transport systems, a frequency for a vehicle radar was classified into small-output radio stations and distributed. The band of the frequency is 1 GHz bandwidth of 76 GHz to 77 GHz, and the use of the band is regulated for collision prevention in vehicles, etc.

SUMMARY OF THE INVENTION

A first object of the present invention is to provide a method for detecting a surrounding environment based on the sensing signal of a CW radar and the sensing signal of an FMCW radar.

A second object of the present invention is to provide an apparatus for performing a method for detecting a surrounding environment based on the sensing signal of a CW radar and the sensing signal of an FMCW radar.

In accordance with an aspect of the present invention for achieving the first object of the present invention, a method of detecting a target based on an FMCW radar sensing signal and a CW radar sensing signal may include sending, by a radar, the CW radar sensing signal for detecting the target and receiving a first response signal that is a response to the CW radar sensing signal, sending, by the radar, the FMCW radar sensing signal for detecting the target and receiving a second response signal that is a response to the FMCW radar sensing signal, generating, by the radar, the frequency spectrum of a beat signal by performing signal processing on the first response signal and the second response signal, and detecting, by the radar, the target based on the frequency spectrum of the beat signal. The radar may determine information about a stop object based on the peak value of a frequency band that belongs to the frequency spectrum of the first response signal and that corresponds to moving speed of the radar. The radar may determine that the stop object is present if the peak value of the frequency band corresponding to the moving speed of the radar is a first threshold or higher, and may determine that the stop object is not present if the peak value of the frequency band corresponding to the moving speed of the radar is less than the first threshold. The radar may detect the target based on the correlation between the first response signal and the second response signal if the number of stop objects is a specific number or higher as a result of determining whether the stop object is present based on the first response signal. The radar may detect the target based on the second response signal if the number of stop objects is less than the specific number as a result of determining whether the stop object is present based on the first response signal.

In accordance with an aspect of the present invention for achieving the second object of the present invention, a radar for detecting a target based on an FMCW radar sensing signal and a CW radar sensing signal may include a processor. The processor may be configured to send the CW radar sensing signal for detecting the target and receive a first response signal that is a response to the CW radar sensing signal, send the FMCW radar sensing signal for detecting the target and receive a second response signal that is a response to the FMCW radar sensing signal, generate the frequency spectrum of a beat signal by performing signal processing on the first response signal and the second response signal, and detect the target based on the frequency spectrum of the beat signal. The radar may determine information about a stop object based on the peak value of a frequency band that belongs to the frequency spectrum of the first response signal and that corresponds to moving speed of the radar. The radar may determine that the stop object is present if the peak value of the frequency band corresponding to the moving speed of the radar is a first threshold or higher, and may determine that the stop object is not present if the peak value of the frequency band corresponding to the moving speed of the radar is less than the first threshold. The radar may detect the target based on the correlation between the first response signal and the second response signal if the number of stop objects is a specific number or higher as a result of determining whether the stop object is present based on the first response signal. The radar may detect the target based on the second response signal if the number of stop objects is less than the specific number as a result of determining whether the stop object is present based on the first response signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
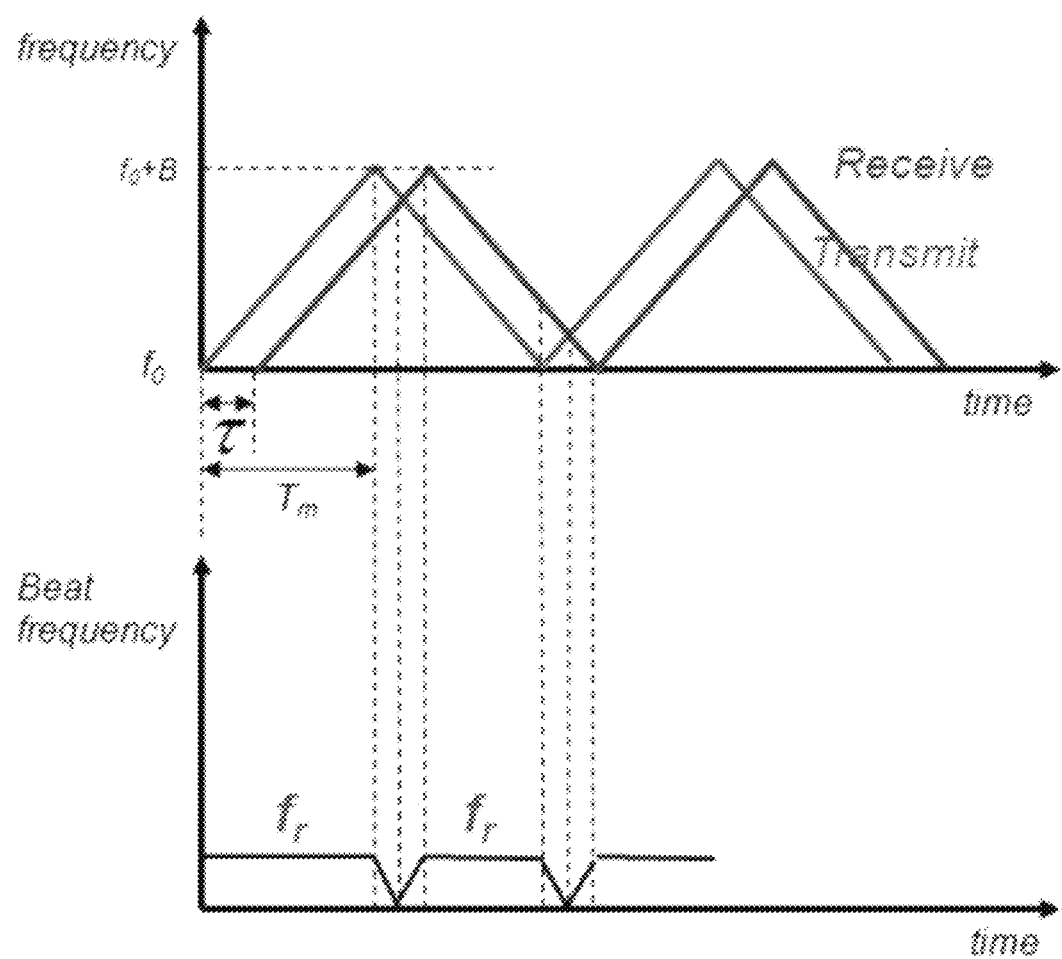
FIG. 1 is a graph illustrating a method of detecting an object using an FMCW radar.

The present invention may be modified in various ways and may be implemented to have several embodiments. Specific embodiments of the present invention are illustrated in the drawings and are described in detail in the detailed description. It is however to be noted that the present invention is not intended to be limited to the specific embodiments, but is intended to include all modifications, equivalents, or substitutions which fall within the spirit and technical scope of the present invention. The same reference numbers are used throughout the drawings to refer to the same or like parts.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. A term "and/or" includes a combination of a plurality of relevant and described items or any one of a plurality of related and described items.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements The terms used in this application are used to only describe the specific embodiments and are not intended to restrict the present invention. An expression of the singular number includes an expression of the plural number unless clearly defined otherwise in the context. In this application, terms, such as "comprise" and 'have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

Hereinafter, some exemplary embodiments of the present invention are described in detail with reference to the accompanying drawings. Hereinafter, the same reference numerals will designate the same elements throughout the drawings, and redundant description of the same elements is omitted.

An embodiment of the present invention discloses a method of sensing a surrounding environment when a vehicle is driven based on an FMCW radar and a CW radar. A surrounding environment may be more precisely sensed using the method of sensing a surrounding environment according to an embodiment of the present invention.

FIG. 1 is a graph illustrating a method of detecting an object using an FMCW radar.

The FMCW radar may send a frequency-modulated continuous signal to a target and measure the distance and velocity of the target.

A common CW radar may measure the velocity of a moving object, but is unable to measure the distance due to a relatively narrow bandwidth. The FMCW radar may modulate the amplitude, frequency, or phase of a transmission wave in order to widen the bandwidth, and thus may perform distance measurement and velocity measurement.

FIG. 1 illustrates a frequency waveform over time, assuming that an object distant from the radar by the distance R remains still. First, when a frequency-modulated signal is linearly transmitted like in a first waveform, the frequency-modulated signal is reflected from the object placed at the distance R, and is received by the radar after time delay of 2R/c. In this case, R is the distance to the target, and c is the velocity of light ($3 \times 10^8$ m/s). At this time, when the transmitted signal and the received signal are mixed, a difference frequency may be obtained. The difference frequency is expressed by Equation 1 below.

$$f_r = \frac{2R}{C} \cdot \frac{B}{T_m} \tag{1}$$

R: distance to target
B: sweep bandwidth
c: velocity of light
$T_m$: sweep time
$f_r$: frequency shift due to delay Information about a difference frequency computed by Equation 1 may be substituted in Equation 2 in order to determine the distance R.

$$R = \frac{f_r \cdot c \cdot T_m}{2 \cdot B} \quad (2)$$

Figure 2:
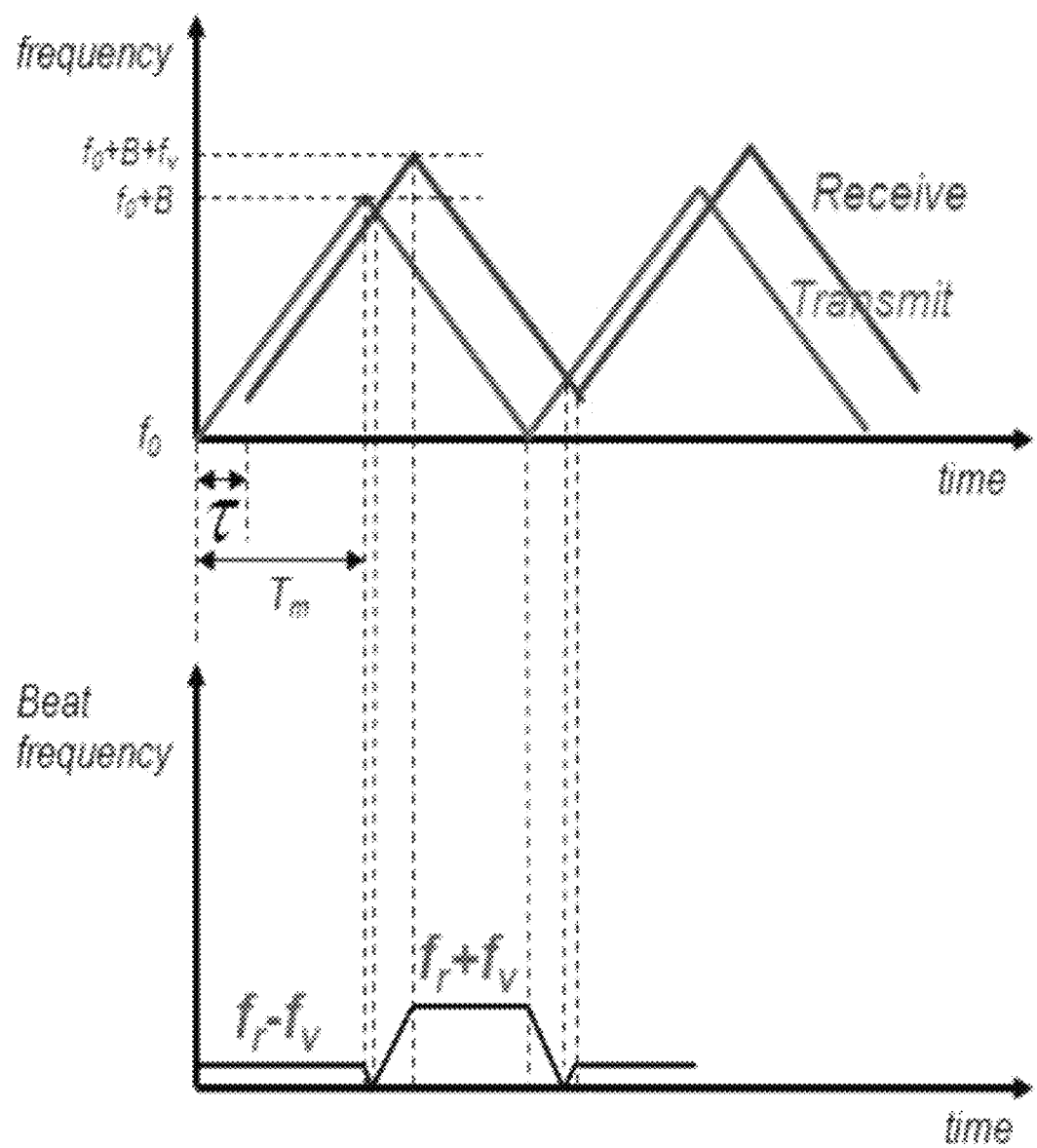
FIG. 2 is a graph illustrating a method of detecting an object using an FMCW radar.

FIG. 2 is a graph illustrating a method of detecting an object using the FMCW radar.

It is assumed that the object distant from the radar by the distance R is moving at relative velocity $V_r$.

The FMCW radar may send the velocity of the target and the distance to the target in order to measure a frequency-modulated continuous signal.

In such a case, a frequency shift, such as Equation 3 below, is generated due to time delay of 2R/c and the Doppler effect.

$$f_v = \frac{2v_r}{\lambda} \quad (3)$$

$$\lambda = \frac{c}{f_c}$$

$f_c$: carrier frequency

When the transmitted signal and a received signal are mixed, the sum and difference (i.e., a Doppler frequency) of a frequency change $f_r$ attributable to the time delay according to the distance and a frequency change $f_v$ attributable to the Doppler effect may be obtained as in the bottom of FIG. 2. Information about the distance and velocity may be obtained as in Equation 4 below through the simultaneity of the sum and difference of the frequency changes.

$$R = \frac{f_r \cdot c \cdot T_m}{2 \cdot B} \quad v_r = \frac{f_v \cdot \lambda}{2} \quad (4)$$

A beat frequency and the Doppler frequency may be obtained by signal processing.

The beat frequency may represent a difference between a transmission signal and a reception signal. In the case of an up-chirp signal, the beat frequency may be expressed by $f_{bu}$. In the case of a down-chirp signal, the beat frequency may be expressed by $f_{bd}$.

The frequency spectrum of a beat signal that has been sampled as a frequency $f_s$ may be obtained by performing Discrete Fourier Transform (DFT) on an $N_s$ point in each chirp cycle. The FMCW radar may detect the object present in the surroundings by sensing a surrounding environment based on the frequency spectrum of the beat signal. In the FMCW radar, while the signal reception unit of the FMCW radar receives a signal of a sensing signal that has been reflected from the target, the signal transmission unit of the FMCW radar sends the sensing signal. The FMCW radar may generate a beat signal by mixing the waveforms of the received signal and the transmitted sensing signal. If one or more targets are present, a beat signal having one or more different frequency bands may become the output of a mixer.

Figure 3:
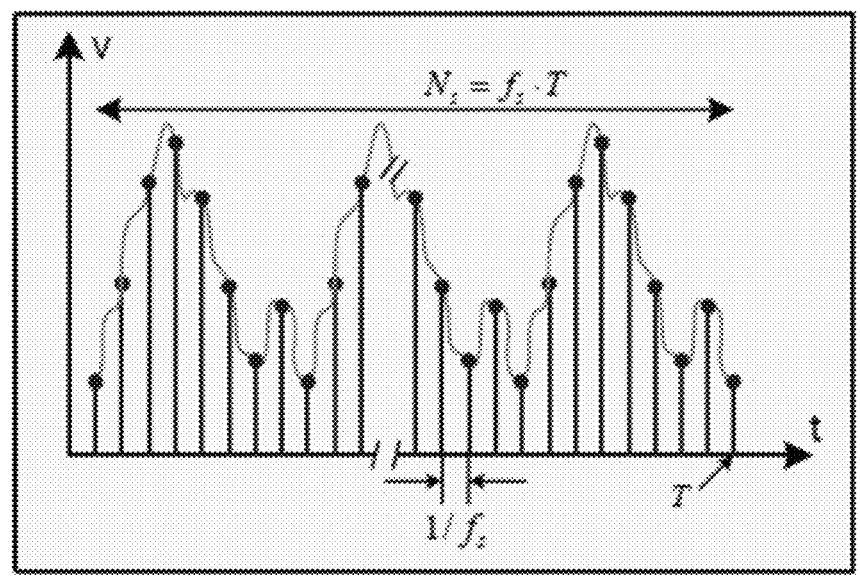
FIG. 3 is a graph illustrating beat signals sampled based on DFT.
Figure 3:
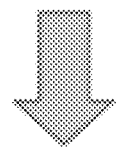
Figure 3:
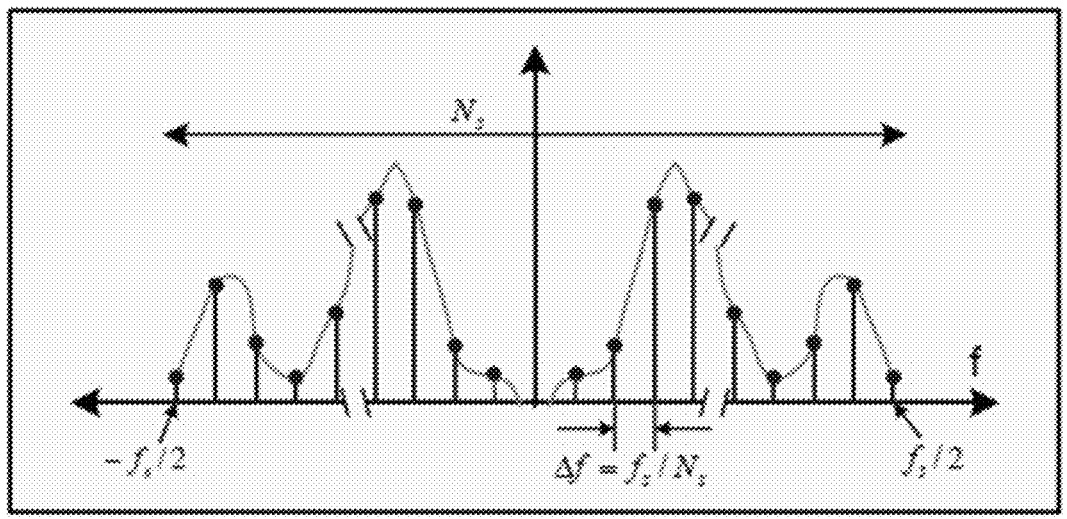

FIG. 3 is a graph illustrating beat signals sampled based on DFT.

FIG. 3 illustrates the spectrum of a beat signal sampled as a frequency $f_s$ by performing DFT on an $N_s$ point in each chirp cycle.

$\Delta f$ is a frequency step, and $N_s$ is the number of data samples in a chirp cycle T.

The FMCW radar generates information about a target by pairing pieces of information about frequency peaks extracted from respective up-chirp and down-chirp signals.

If the relative velocity of a vehicle ahead is a positive value (e.g., if the distance between the vehicle ahead and a vehicle following the vehicle ahead is increased), a beat frequency sensed in up-chirp, that is, a frequency rise section, and a beat frequency sensed in down-chirp, that is, a frequency fall section, are $f_{bu}=f_r-f_d$ and $f_{bd}=f_r+f_d$. That is, values shifted based on $f_r$ so that the values are symmetrical to a value $\pm f_d$—are $f_{bu}$ and $f_{bd}$. The distance and velocity of the vehicle ahead may be obtained by searching for a combination. This method is called a pairing algorithm.

In performing the pairing algorithm, if the number of targets is two or more, targets greater than the two or more targets may be sensed. Such targets are called ghost targets. If such ghost targets are present, it is difficult for the FMCW radar to precisely sense an object.

If the number of targets is increased in performing the pairing algorithm, many ghost targets are generated. A variety of kinds of schemes may be used to prevent a ghost target from occurring. A probability that a ghost target may occur is increased according to an increase in frequency peaks that are extracted from up-chirp and down-chirp. If a structure is lengthily spread out on a road like a tunnel or a guard rail, it may be further difficult for the radar to perform detection. In such a case, the generation of a ghost target may endanger the detection of the radar and control stability.

A sensing method based on the FMCW radar according to an embodiment of the present invention may increase a sensing probability based on the FMCW radar by reducing the probability that a ghost target may occur. That is, if an embodiment of the present invention is applied, a phenomenon, such as quick braking during high-speed driving, may be prevented by reducing the probability that a ghost target occurs if a structure is lengthily spread out on a road like a tunnel or a guard rail.

Figure 4:
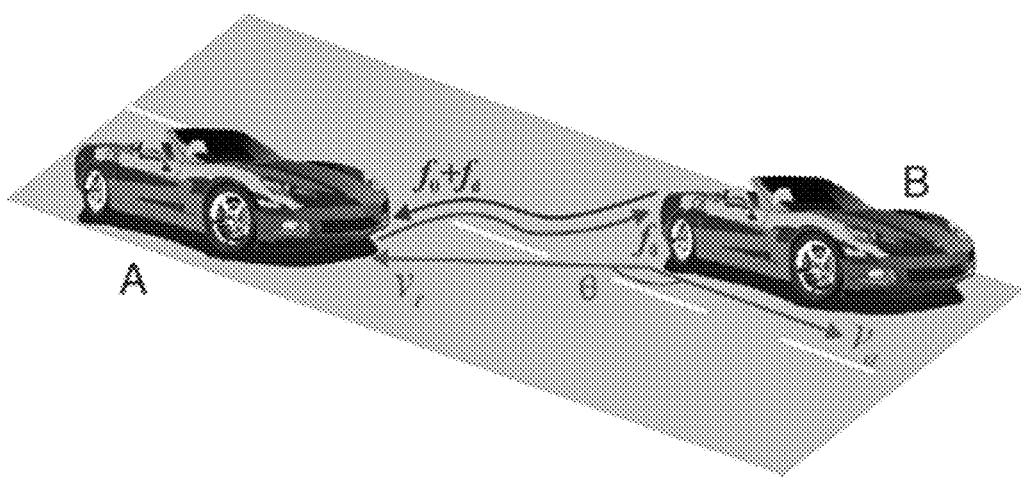
FIG. 4 is a conceptual diagram illustrating the operation of a CW antenna.

FIG. 4 is a conceptual diagram illustrating the operation of a CW antenna.

Referring to FIG. 4, the CW antenna may use a fixed transmission frequency in order to measure the velocity of a moving target. The CW antenna may measure the velocity of the moving target based on a Doppler frequency shift. If the signal of a frequency to transmitted by the CW radar and the relative velocity $v_r$ of the moving target are not 0, a received signal may have a frequency of $f_0+f_d$.

In this case, $f_d$ is the Doppler frequency shift, and may be determined as in Equation 5.

$$f_d = \frac{2v_r}{c} f_0 \quad (5)$$

In Equation 5, c is the velocity of light, the relative velocity of the target $v_r$ may be determined to be a velocity element according to the Line Of Sight (LOS) of the CW radar. Equation 6 below expresses the relative velocity of the target.

$$V_r = V_a \cos \theta \quad (6)$$

In Equation 6, $V_a$ is the real velocity of the target, and $\theta$ may denote an angle between the track of the target and the LOS of the CW radar.

That is, in the method of measuring velocity based on the CW radar, the modulation frequency of a Doppler frequency occurring when a laser is transmitted to a moving object is used. For example, if the sender of a sensing signal sends a continuous wave of 1024 GHz toward an object in the state in which the sender remains still, a reflected wave having a frequency slightly different from an oscillating frequency is returned. A difference between the frequencies (i.e., a Doppler frequency) is proportional to the velocity of the object. Accordingly, if the frequency difference is aware, the velocity of the object may be calculated. A CW radar system may be use to measure velocity, but is unable to be used to measure the distance.

An embodiment of the present invention discloses a method of detecting an object using both the signals of a CW radar and an FMCW radar.

Figure 5:
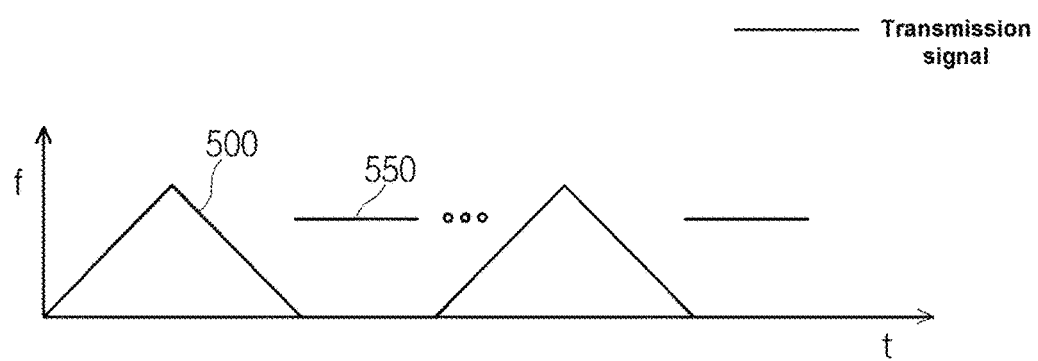
FIG. 5 is a conceptual diagram illustrating signals transmitted by radars according to an embodiment of the present invention.

FIG. 5 is a conceptual diagram illustrating signals transmitted by radars according to an embodiment of the present invention.

Referring to FIG. 5, the signals transmitted by the radars according to an embodiment of the present invention may include a frequency-modulated continuous signal 500, that is, the transmission signal of an FMCW radar, and a signal 550 transmitted in a single frequency band, that is, the transmission signal of a CW radar.

If a transmission signal is generated by combining the CW radar signal 550 with the FMCW radar signal 500, a frequency in which the velocity and distance of a target are combined may be extracted from the FMCW radar signal 500 in each of up-chirp and down-chirp. A Doppler frequency corresponding to a velocity component may be extracted from the CW radar signal 550 if the velocity of a target is present. If such a characteristic of the CW radar is used, when a road is present in a structure, such as a guard rail or a tunnel, the structure has relative velocity due to the velocity of a vehicle being driven although it is a stop object.

Information about the velocity of a vehicle being driven may be obtained using various sensors mounted on the vehicle. If a velocity component corresponding to the velocity of the vehicle being driven has a high peak in the frequency spectrum of a continuous wave as described above, many stop objects may be determined to be present on a road.

That is, in an embodiment of the present invention, if the velocity of a vehicle being driven is to be obtained using another sensor mounted on the vehicle, a current road environment may be recognized because an object that remains still may be sensed based on a peak level corresponding to a frequency, corresponding to the velocity of the vehicle being driven, in the frequency spectrum of the CW radar signal 550.

Furthermore, in an embodiment of the present invention, if a plurality of stop objects is determined to be present through preference determination based on the CW radar signal 550, the distribution locations of the stop objects may be determined through the correlation between the frequency spectra of an up-chirp signal and a down-chirp signal. If stop objects less than a specific number are determined to be present, a road environment may be determined based on only the response signal of an FMCW radar signal.

The CW radar and the FMCW radar may send a CW radar signal and an FMCW radar signal in various ways. For example, a method of sending a CW radar signal and then sending an FMCW radar signal during a specific section may be used. In another method, whether or not to send an additional CW radar signal may be determined based on the reflection signal of a CW radar signal.

Figure 6:
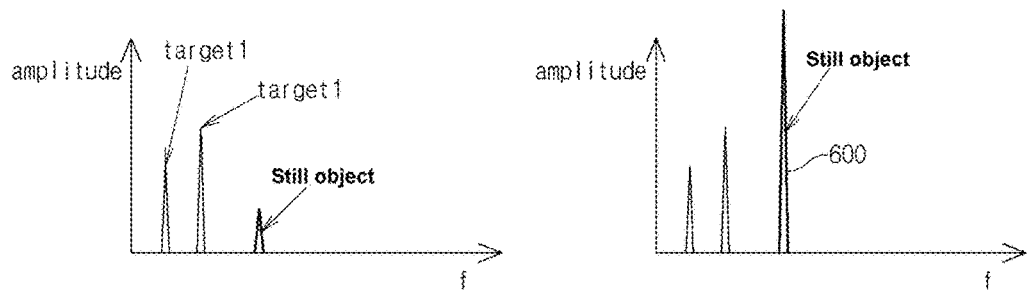
FIG. 6 is a conceptual diagram illustrating signals analyzed based on the signal of a CW radar according to an embodiment of the present invention.

FIG. 6 is a conceptual diagram illustrating signals analyzed based on the signal of a CW radar according to an embodiment of the present invention.

A graph on the left side of FIG. 6 illustrates a situation in which a structure is not present on a road, and a graph on the right side of FIG. 6 illustrates a situation in which a structure is present on a road. If a structure is present on a road compared to a normal situation, such as the right side of FIG. 6, the peak level 600 of a frequency component corresponding to the velocity of a vehicle being driven suddenly rises. Accordingly, a road environment may be recognized because information about a structure peripheral to a road on which a vehicle is being driven may be obtained based on such sensing results.

Figure 7:
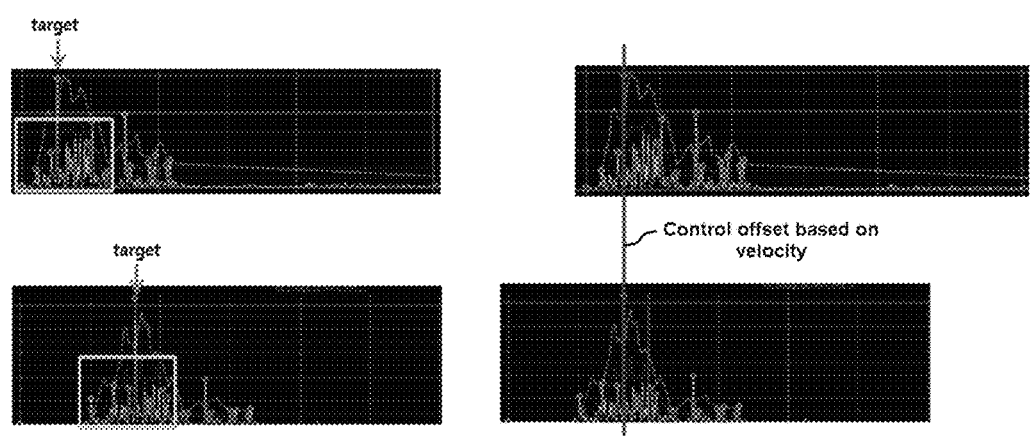
FIG. 7 is a conceptual diagram illustrating a method of detecting a target according to an embodiment of the present invention.

FIG. 7 is a conceptual diagram illustrating a method of detecting a target according to an embodiment of the present invention.

The left side of FIG. 7 illustrates the frequency spectrum of a beat signal obtained after an FMCW signal is mixed with a signal received after the FMCW signal is transmitted. If a guard rail or a tunnel is present in an area where the FMCW radar performs sensing, the level of a clutter rises as in a square area illustrated in FIG. 7. The clutter refers to an object that produces an unwanted radar reception signal.

In the graphs of FIG. 7, an x axis denotes the range of an effective frequency, and a y axis denotes the size of the beat signal. A frequency peak extracted from the entire effective frequency region is expressed by a circle.

The right side of FIG. 7 illustrates a method of controlling an offset based on information about the velocity of a target that is obtained based on a CW radar signal after frequency signals are obtained in up-chirp and down-chirp, respectively, based on the FMCW radar signal on the left side of FIG. 7 and recognizing a road environment based on the correlation between the two signals. That is, in accordance with an embodiment of the present invention, a target may be searched for using both a signal transmitted by the CW radar and a signal transmitted by the FMCW radar.

In an embodiment of the present invention, if the velocity of a vehicle being driven is obtained using another sensor within the vehicle, a road environment may be recognized because a stop object may be sensed based on a peak level corresponding to a frequency, corresponding to the velocity of the vehicle being driven, in the frequency spectrum of a CW signal.

Furthermore, in an embodiment of the present invention, if a plurality of stop objects is determined to be present through preference determination based on a CW radar signal, the distribution locations of the stop objects may be determined based on the correlation between the frequency spectra of an up-chirp signal and a down-chirp signal.

Figure 8:
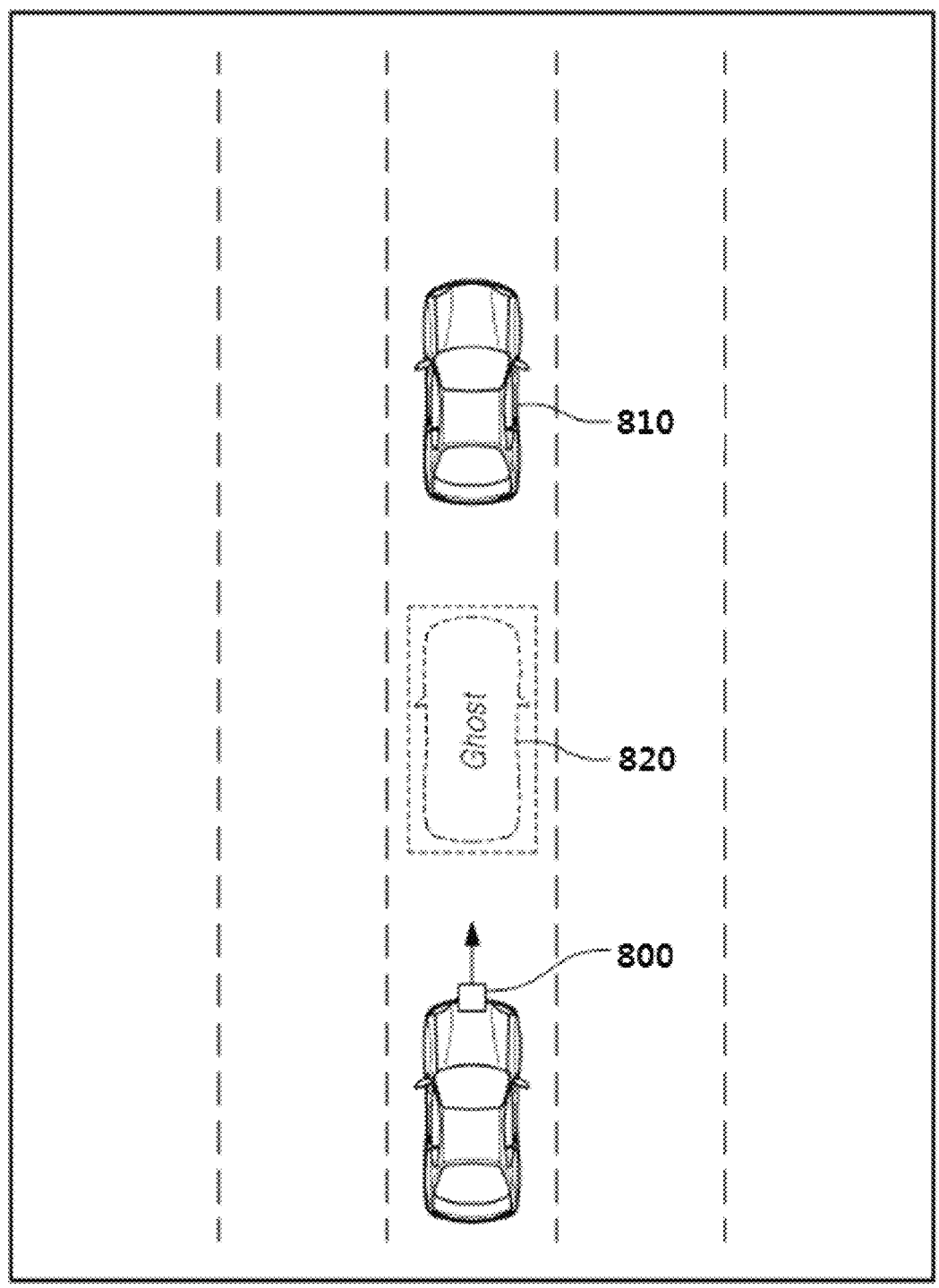
FIG. 8 is a diagram illustrating that a target object is sensed based on the sensing signal of a CW radar and the sensing signal of an FMCW radar according to an embodiment of the present invention.

FIG. 8 is a diagram illustrating that a target object is sensed based on the sensing signal of a CW radar and the sensing signal of an FMCW radar according to an embodiment of the present invention.

Referring to FIG. 8, in a sensing method according to an embodiment of the present invention, a surrounding object may be sensed based on a reflection signal by sending the sensing signal of the CW radar and the sensing signal of the FMCW radar 800 and then receiving a reflection signal that is reflected and returned from a target 810.

If the reflection signal includes a signal reflected from the real target 810, that is, an object, the target 810, that is, the real object, may be precisely sensed. However, a signal transmitted by another nearby radar apparatus or another communication device may function as an interference signal, or a clutter, such as a guard rail or a tunnel, may generate an interference signal. If an interference signal attributable to other factors is present and the interference signal is received as a reflection signal along with a signal reflected from the target 810 that is the real object, a ghost object 820 that is not a real object may be sensed due to such an interference signal.

For example, the radar apparatus 800 according to an embodiment of the present invention may send the sensing signal of a CW radar, and may obtain information about a stop object. As described above, information about the stop object may be obtained based on the peak value of a reflection signal sensed by the CW radar, and obtain information about a road environment may be primarily obtained. Thereafter, the radar apparatus 800 may send the sensing signal of an FMCW radar and determine information about the target. In obtaining the information about the target based on the reflection signal of the sensing signal transmitted by the FMCW radar, the information about the stop object that has been primarily determined by the CW radar may be taken into consideration. If a plurality of stop objects is determined to be present through preference determination based on the signal of the CW radar as described above, the distribution locations of the stop objects may be determined based on the correlation between the frequency spectra of an up-chirp signal and a down-chirp signal.

Figure 9:
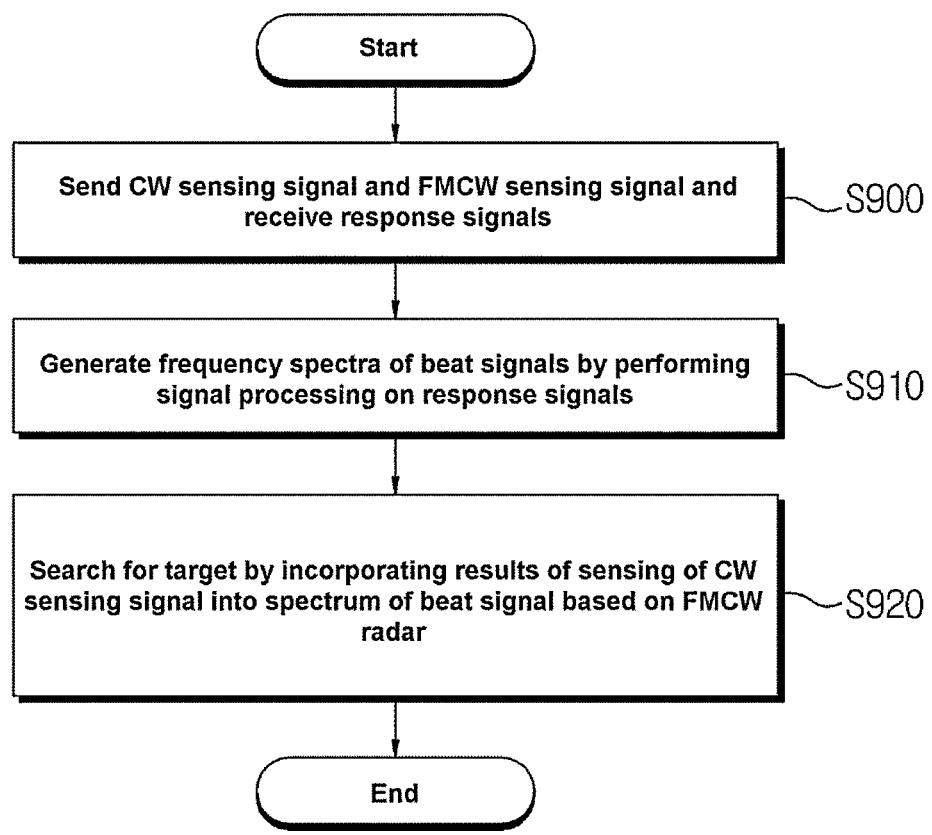
FIG. 9 is a conceptual diagram illustrating a method of detecting, by an FMCW radar apparatus, a target according to an embodiment of the present invention.

FIG. 9 is a conceptual diagram illustrating a method of detecting, by an FMCW radar apparatus, a target according to an embodiment of the present invention.

Referring to FIG. 9, the sensing signal of an FMCW radar and the sensing signal of a CW radar may be sent, and response signals for the sensing signals may be received at step S900.

The CW radar may send the sensing signal in order to determine a stop object. Information about the velocity of a vehicle being driven is able to be obtained. Thus, if a peak level in a velocity component corresponding to the velocity of the vehicle being driven is high in the frequency spectrum of a signal received by the CW radar, many stop objects may be determined to be present on a road. That is, a road environment may be preferentially determined based on the sensing signal of the CW radar. Furthermore, the FMCW radar may send a frequency-modulated continuous sensing signal for measuring the distance and velocity of a target. The transmitted continuous sensing signal may be reflected from a target object within a sensing range, and the FMCW radar may receive a response signal for the sensing signal.

The frequency spectra of beat signals are generated by performing signal processing on the response signals at step S910.

The FMCW radar may generate the frequency spectrum of the beat signal by mixing the transmitted sensing signal and the received response signal and performing signal processing, such as Fast Fourier Transform (FFT). The FMCW radar generates information about the target by pairing pieces of information about frequency peaks extracted in up-chirp and down-chirp, respectively.

The target is searched for by incorporating the sensing results of the signal of the CW radar into the spectrum of the beat signal obtained based on the FMCW radar at step S920.

If many stop objects are determined to be present based on the signal of the CW radar, the distribution locations of the stop objects may be determined based on the correlation between the frequency spectra of the up-chirp signal and the down-chirp signal. For example, if frequency signals are obtained in up-chirp and down-chirp, respectively based on the signal of the FMCW radar, an offset may be controlled based on information about the velocity of a target that has been obtained based on the signal of the CW radar, and a road environment may be recognized based on the correlation between the two signals. Furthermore, in accordance with an embodiment of the present invention, if stop objects less than a specific number are determined to be present, a road environment may be determined based on only a response signal for the signal of an FMCW radar.

Figure 10:
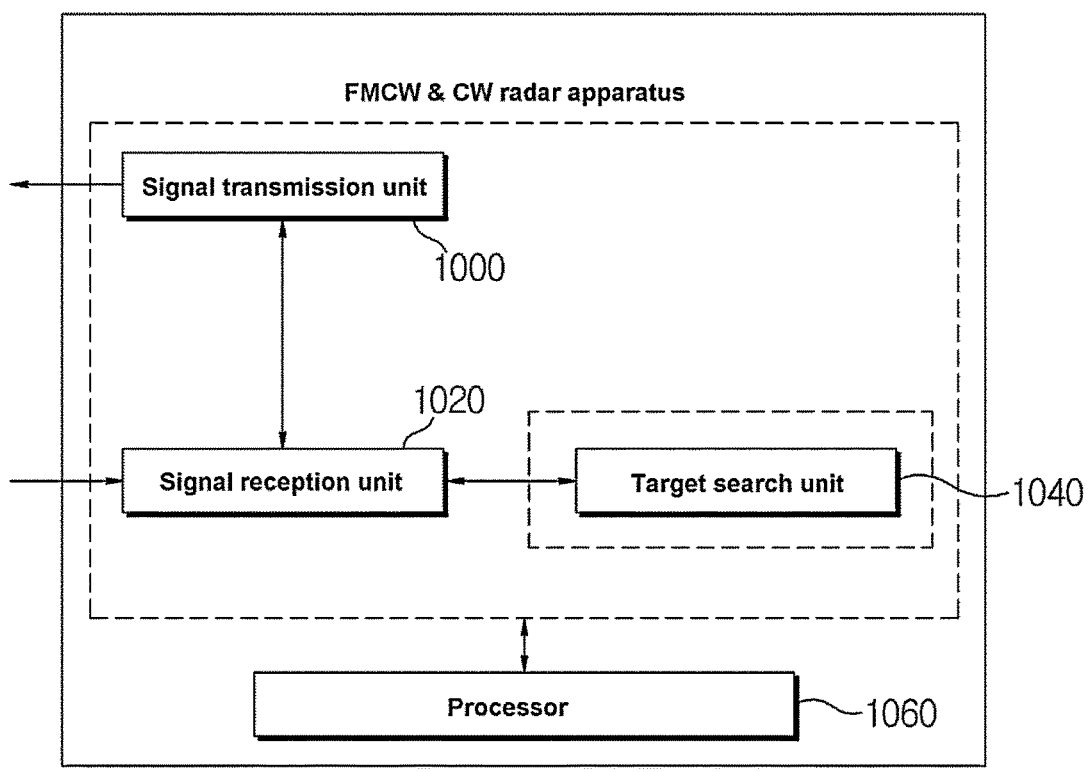
FIG. 10 is a conceptual diagram illustrating the FMCW radar apparatus according to an embodiment of the present invention.

FIG. 10 is a conceptual diagram illustrating an FMCW radar apparatus according to an embodiment of the present invention.

Referring to FIG. 10, the FMCW radar apparatus according to an embodiment of the present invention may include a signal transmission unit 1000, a signal reception unit 1020, a target search unit 1040, and a processor 1060.

The signal transmission unit 1000 may be configured to send a sensing signal. The signal transmission unit 1000 may be configured to control a transmission start point interval between the transmission start points of transmission signals and to send a transmission signal at each transmission start point determined based on the controlled transmission start point interval. For example, the signal transmission unit 1000 may include a Phase-Locked Loop (PLL), a Voltage-Controlled Oscillator (VCO), and an amplifier. The PLL may be configured to regularly maintain the frequency of a provided transmission signal. The VCO may modulate the frequency of the transmission signal provided by the PLL and provide the modulated frequency to the amplifier. The amplifier may amplify the modulated frequency in a predetermined amount. The signal transmission unit 1000 may send both the sensing signal of an FMCW radar and the sensing signal of a CW radar.

The signal reception unit 1020 may receive a reflection signal that has been reflected nearby after the transmission signal is transmitted by the signal transmission unit 1000. The signal reception unit 1020 may receive the response signal generated based on the sensing signal of the FMCW radar and the sensing signal of the CW radar.

The target search unit 1040 may search for a target based on a response signal that has been generated based on the sensing signal of the FMCW radar and the sensing signal of the CW radar received by the signal reception unit 1020.

If frequency signals are obtained in up-chirp and down-chirp, respectively, based on the signal of the FMCW radar, for example, the target search unit 1040 may control an offset based on information about the velocity of the target that has been obtained based on the signal of the CW radar, and may recognize a road environment based on the correlation between the two signals.

As described above, in accordance with the method and apparatus for detecting a surrounding environment based on the sensing signals of a CW radar and an FMCW radar according to embodiments of the present invention are used, if frequency signals are obtained in up-chirp and down-chirp, respectively, based on the signal of the FMCW radar, an offset may be controlled based on information about the velocity of a target that has been obtained based on the signal of the CW radar, and a road environment can be recognized based on the correlation between the two signals. If such a method is used, a road environment can be more precisely recognized.

While the present invention has been described with respect to the specific embodiments, it will be apparent to those skilled in the art that various changes and modifications may be made without departing from the spirit and scope of the invention as defined in the following claims.

What is claimed is:

1. A method of detecting a target based on a Frequency-Modulated Continuous Wave (FMCW) radar sensing signal and a Continuous Wave (CW) radar sensing signal, the method comprising:

sending, by a radar, the CW radar sensing signal for detecting the target and receiving a first response signal that is a response to the CW radar sensing signal;

sending, by the radar, the FMCW radar sensing signal for detecting the target and receiving a second response signal that is a response to the FMCW radar sensing signal;

generating, by the radar, a frequency spectrum of a beat signal by performing signal processing on the first response signal and the second response signal;

when frequency signals are obtained in up-chirp and down-chirp of the frequency spectrum, respectively, adjusting, by the radar, an offset of the frequency spectrum based on information about a velocity of the target; and detecting, by the radar, the target based on the frequency spectrum of the beat signal and based on the adjusted offset, wherein, the radar determines information about a stop object based on a peak value of a frequency band that belongs to a frequency spectrum of the first response signal and that corresponds to moving speed of the radar, and when a number of the determined stop objects is equal to or higher than a specific number, the radar detects the target based on a correlation between the up-chirp of the second response signal and the down-chirp of the second response signal.

2. The method according to claim 1, wherein the radar determines that the stop object is present if the peak value of the frequency band corresponding to the moving speed of the radar is a first threshold or higher and determines that the stop object is not present if the peak value of the frequency band corresponding to the moving speed of the radar is less than the first threshold.

3. The method according to claim 1, wherein the radar detects the target based on the second response signal if the number of stop objects is less than the specific number as a result of determining whether the stop object is present based on the first response signal.

4. A radar for detecting a target based on a Frequency-Modulated Continuous Wave (FMCW) radar sensing signal and a Continuous Wave (CW) radar sensing signal, wherein:

the radar comprises a processor, and the processor is configured to:

send the CW radar sensing signal for detecting the target and receive a first response signal that is a response to the CW radar sensing signal;

send the FMCW radar sensing signal for detecting the target and receive a second response signal that is a response to the FMCW radar sensing signal;

generate a frequency spectrum of a beat signal by performing signal processing on the first response signal and the second response signal;

when frequency signals are obtained in up-chirp and down-chirp of the frequency spectrum, respectively, adjust an offset of the frequency spectrum based on information about a velocity of the target; and detect the target based on the frequency spectrum of the beat signal and based on the adjusted offset, wherein the radar determines information about a stop object based on a peak value of a frequency band that belongs to a frequency spectrum of the first response signal and that corresponds to moving speed of the radar, and when a number of the determined stop objects is equal to or higher than a specific number, the radar detects the target based on a correlation between the up-chirp of the second response signal and the down-chirp of the second response signal.

5. The radar according to claim 4, wherein the radar determines that the stop object is present if the peak value of the frequency band corresponding to the moving speed of the radar is a first threshold or higher and determines that the stop object is not present if the peak value of the frequency band corresponding to the moving speed of the radar is less than the first threshold.

6. The radar according to claim 4, wherein the radar detects the target based on the second response signal if the number of stop objects is less than the specific number as a result of determining whether the stop object is present based on the first response signal.

* * * * *